Nov. 25, 1947.  F. E. FREY  2,431,549
CONVERSION OF OLEFINS WITH HYDROGEN FLUORIDE CATALYST
Filed Feb. 10, 1942
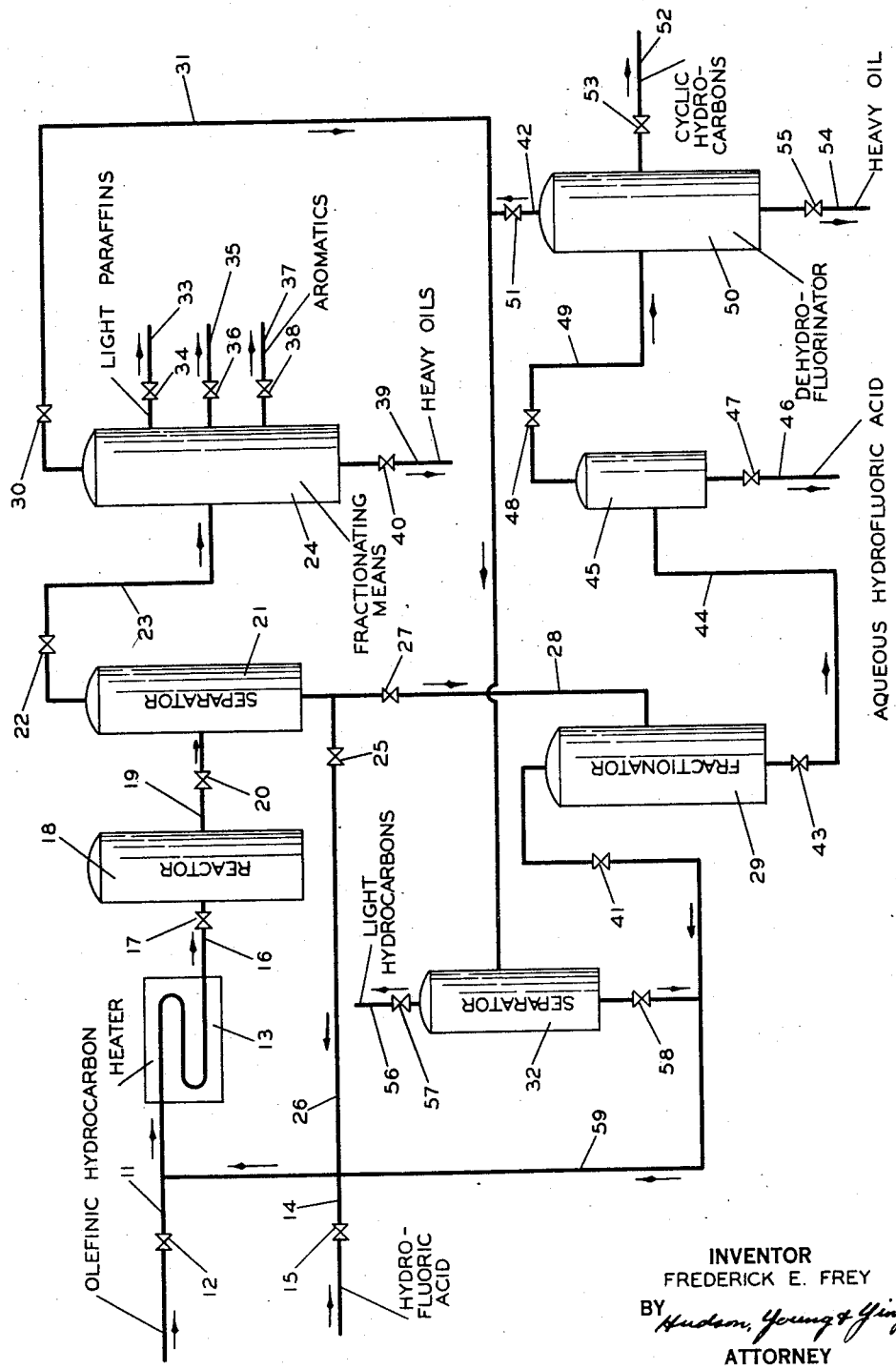
INVENTOR
FREDERICK E. FREY
BY *Hudson, Young & Ginger*
ATTORNEY Patented Nov. 25, 1947

2,431,549

UNITED STATES PATENT OFFICE 2,431,549

CONVERSION OF OLEFINS WITH HYDROGEN FLUORIDE CATALYST

Frederick E. Frey, Bartlesville, Okla., assignor to Phillips Petroleum Company, a corporation of Delaware Application February 10, 1942, Serial No. 430,295

3 Claims. (Cl. 260—673)

This invention relates to a process for reconstructing hydrocarbon materials. More particularly, it relates to the reconstruction of aliphatic olefin hydrocarbons in the presence of hydrofluoric acid as a catalyst. This application is a continuation-in-part of my application, Serial No. 426,627, filed January 13, 1942, now U. S. Patent 2,403,649, issued July 9, 1946.

An object of this invention is to provide a process for catalytically transforming olefin hydrocarbons to aromatic hydrocarbons with concomitant formation of paraffin hydrocarbons.

Other objects and advantages of my invention will be apparent from the following description and discussion.

I have discovered that, in the presence of substantial proportions of concentrated or anhydrous hydrofluoric acid as a catalyst, aliphatic olefin hydrocarbons can be catalytically reconstructed to produce aromatic hydrocarbons with concomitant formation of aliphatic paraffin hydrocarbons. Further, I have found that, under certain conditions, a substantial conversion of olefins to naphthene hydrocarbons is effected.

Olefins having two to twelve or more carbon atoms per molecule are readily converted to paraffins and aromatics by the process of my invention. The reactions may be exemplified by the following chemical equations:

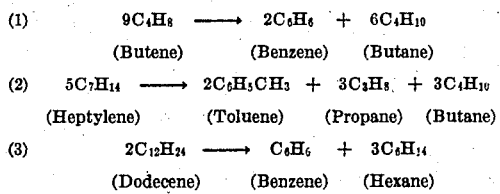

The actual reactions are, of course, more complex as to mechanism and products and involve polymerization preceding hydrogen migration. In general, several molecules of olefin appear to react in such a way that one or more molecules or fragments thereof are cyclized and dehydrogenated with concurrent hydrogenation of one or more other olefin molecules or fragments. Since under some conditions cyclo-paraffins and/or cycloolefins are found in the products, these hydrocarbons may possibly be intermediate compounds in the reactions of my process. These reactions are complicated by side reactions which form naphthenes and heavy polymers. However, I have found that the formation of naphthenes may be minimized by using relatively high reaction temperatures. Also, I have found that the formation of heavy polymers is minimized by using relatively long reaction times and/or high temperatures; in fact, at high temperatures, such as 300 to 550° C. heavy olefin polymers may be used as feed material in this process to produce aromatic and paraffin hydrocarbons.

The reconstruction of olefins to produce paraffins and aromatics in the presence of hydrogen fluoride as a catalyst may be carried out at temperatures in the range of 0 to 600° C. The optimum temperature is usually in the range 150 to 400° C. At low temperatures polymerization is extensive and high polymers result, whereas at high temperatures cracking and carbonization reactions occur. The contact time required depends upon the temperature and the specific nature of the feed material for any particular case. Usually the optimum reaction time is in the range of 1 to 100 minutes. In this range, the shorter times apply to the higher reaction temperatures and/or the more readily convertible feed materials, and the longer times apply to the lower temperatures and/or the less readily convertible feed materials. Pressure has some effect upon the composition of the products. At very high pressures there is a tendency to form relatively large proportions of polynuclear cyclics and other high-boiling hydrocarbons, whereas at very low pressures, particularly at the higher temperatures within my range, there is a tendency to produce excessive proportions of normally gaseous hydrocarbons. Usually, the optimum operating pressure is in the range of 50 to 1000 pounds per square inch; but at low temperatures, in order to minimize the formation of heavy polymers, it is sometimes desirable to use lower pressures; and at high temperatures, in order to minimize cracking, it is sometimes desirable to use higher pressures. A moderately low olefin partial pressure and rather high temperature are conducive to the formation of simple aromatics. The optimum operating conditions in any particular instance may be readily determined by trial.

Under some conditions, substantial proportions of cyclic products appear to be formed as the hydrogen fluoride addition products of cyclic hydrocarbons; these are mostly dissolved in the concentrated hydrofluoric acid phase when separate acid and hydrocarbon phases are present. From these, fluorine-free cyclics are readily recovered by distilling off the free hydrogen fluoride and by heating the remaining hydrofluorinated organic material, for example to a maximum temperature in the range of 120 to 150° C., to effect a thermal decomposition, whereby hydrogen fluoride is split out.

A wide variety of products is obtained by the practice of my invention. Simple aromatics such as benzene, toluene, xylenes, etc., are readily obtained under the conditions described herein and may be recovered in a pure state from the effluent. Concomitantly, there are formed aliphatic paraffins, the molecular weight of which depends to a large extent upon the conditions of temperature and pressure used. At intermediate values of my preferred ranges of operation conditions, substantial proportions of the paraffinic products boil within the motor-fuel range, and are suitable for use in motor fuel. Naphthenes may be produced in preponderance at time temperature conditions less severe than those required to produce largely aromatics. Although it is known that alkylation reactions between olefins and saturated hydrocarbons are promoted by hydrofluoric acid, it is not intended that my invention shall include a process only for the alkylation of saturated hydrocarbons by reaction with olefins charged to my process.

An understanding of some aspects of my invention my be aided by the accompanying drawing, which is a flow diagram of one arrangement of equipment for practicing the invention.

A suitable olefin feed material is admitted through inlet 11 and valve 12 to temperature-adjusting coil 13. Concentrated or substantially anhydrous hydrofluoric acid is admitted through inlet 14 and valve 15, also to temperature-adjusting coil 13. The resulting mixture is heated or cooled, as is required for any particular case, in coil 13 approximately to the desired reaction temperature, and it then is passed through conduit 16 and valve 17 to reactor 18.

Various ways of using coil 13 and reactor 18 are possible. If the desired reaction temperature is high, coil 13 may be heated by flue gases; if the reaction temperature is very low, the coil may be heated or cooled by a liquid medium maintained at a selected temperature. Reactor 18 preferably is operated adiabatically, but, if it is desired, for example, to compensate for the heat of reaction, it may be heated or cooled by any suitable means. When short reaction times such as 1 to 10 minutes are used, the reaction can be completed in coil 13, and reactor 18 may be by-passed or removed from the system.

The reaction mixture from reactor 18 is passed through conduit 19 and valve 20 to separator 21, wherein, it is separated into two liquid phases, as by cooling and gravitational or centrifugal means. The lighter or hydrocarbon phase is passed through valve 22 and conduit 23 to fractionating means 24. The heavier or hydrofluoric acid phase may be recycled directly through valve 25 and conduit 26 to coil 13; preferably, however, at least part of it is passed through valve 27 and conduit 28 to fractionating means 29.

Fractionating means 24 separates the hydrocarbon phase from separator 21 into desired products and by-products; for example, into the following five fractions: (1) a fraction comprising an azeotropic mixture of hydrogen fluoride and normally gaseous products, which is passed through valve 30 and conduit 31 to separator 32; (2) a fraction comprising normally gaseous paraffin hydrocarbons, which may be withdrawn through outlet 33 having valve 34; (3) a fraction comprising paraffinic and naphthenic hydrocarbons suitable for use in motor fuel, which is withdrawn through outlet 35 having valve 36; (4) a fraction comprising one or more simple aromatics such as benzene, toluene, xylenes, etc., which is withdrawn through outlet 37 having valve 38; and (5) a relatively high-boiling oil comprising paraffins, aromatics, and naphthenes, which is withdrawn through outlet 39 having valve 40. It is understood that fractionating means 24 may comprise any necessary number of distilling columns, units for azeotropic distillations, etc. If desired, solvent-extraction and-or chemical methods may be used in conjunction with fractionating means 24 to effect separations into specific products of high purity, as will be appreciated and can be supplied by one skilled in the art.

Fractionating means 29 separates part or all of the hydrofluoric acid phase from separator 21 into two fractions: (1) an overhead fraction comprising substantially anhydrous hydrogen fluoride and some light hydrocarbons, which is recycled through valve 41 and conduit 59 to coil 13; and (2) a bottom fraction comprising acid-soluble organic material, some water, and some hydrogen fluoride, which is passed through valve 43 and conduit 44 to separator 45.

In separator 45, this bottom fraction from fractionator 29 is separated, into an aqueous hydrofluoric acid phase, as by cooling and gravitational means, which is withdrawn through outlet 46 having valve 47, and into a hydrocarbon or fluorinated-hydrocarbon phase, which is passed through valve 48 and conduit 49 to reaction and fractionating means 50.

Fractionating means 50, which may be termed a dehydrofluorinator, effects thermal decomposition of fluoro-organic material, and separation into several fractions, such as, for example, the following three: (1) an overhead fraction comprising hydrogen fluoride and light hydrocarbons, which is passed through valve 51 and conduit 42 to separator 32; (2) a fraction comprising simple or mononuclear cyclics, which is withdrawn through outlet 52 having valve 53; and (3) a relatively high-boiling fraction comprising hydrocarbons of relatively high molecular weight, such as polynuclear aromatic and other cyclic compounds, which is withdrawn through outlet 54 having valve 55.

Separator 32, effects a separation of the overhead fractions from fractionators 24 and 50 into two liquid phases: (1) a hydrocarbon phase which may be withdrawn through outlet 56 having valve 57, and (2) a substantially anhydrous hydrofluoric acid phase, which may be recycled through valve 58 and conduit 59 to coil 13.

The proportion of concentrated hydrofluoric acid present in the reaction zone in this process may be from 0.2 or less to 3 or more times by weight of the hydrocarbon material treated; preferably it is in the range of 0.5 to 1.5. With smaller proportions the rate of conversion is slow, and with larger proportions the volume of acid which must be handled is unnecessarily large.

Although reactor 18 may be unpacked, it is usually preferably packed with a contact material resistant to hydrofluoric acid. Among contact materials may be mentioned metals, such as various steels, Monel metal, nickel alloys, magnesium and/or aluminum alloys, and the like, and granular substances, such as alumina, bauxite, carbon, certain plastics, and the like.

The following example, which is illustrative and not necessarily limitative, illustrates some of the many aspects of my invention.

Into a steel bomb were charged 2.05 pounds of substantially pure hydrogen fluoride and 1.90 pounds of butene-1. During a period of five hours, the bomb was gradually heated to 121° C., at which temperature the pressure was about 500 pounds per square inch. The bomb was then cooled and the products were removed. The hydrocarbon material recovered was 1.28 pounds, or 67 per cent by weight of the original butene-1. This material had a specific gravity of 0.7404 at 25° C. and a refractive index of 1.4171 at 20° C.; it was completely saturated as determined by the bromine test. It was found by fractional analysis and a study of the properties of the various fractions to have the following composition, in per cent by weight:

| | |
|---|---|
| Isopentane | 9.2 |
| Hexanes | 15.4 |
| Heptanes, benzene, etc | 10.0 |
| Octanes, toluene, etc | 11.4 |
| Paraffins and cycloparaffins boiling 125 to 200° C | 42.2 |
| Aromatics boiling 125 to 200° C | 2.4 |
| Hydrocarbons boiling above 200° C | 9.4 |
| | 100.0 |

This example shows that a multiplicity of valuable products can be produced by reconstructing olefins in the presence of hydrogen fluoride. From each of the above fractions individual hydrocarbons of high purity may be separated, as products, by one skilled in the art.

My invention provides a process for converting aliphatic olefins, which may be derived from any suitable source, for example by dehydrogenating paraffins, into valuable products such as simple aromatic hydrocarbons, paraffin hydrocarbons boiling in the motor fuel range, and naphthene hydrocarbons. Although olefins of any number of carbon atoms per molecule appear to be susceptible to reconstruction by this process, I prefer to begin with olefins boiling outside of the motor fuel range, especially gaseous olefins, in order to obtain the advantages of an appreciable conversion into hydrocarbons that do boil in the motor fuel range.

There are many useful modifications of my invention of which only a few are described in this specification. Additional equipment such as coolers, pumps, valves, fractionators, and other well-known devices may be used wherever necessary or convenient in any particular case. The scope of my invention should not be unduly limited by specific materials, equipment, and the like mentioned herein.

I claim:

1. The process of reconstructing a low-boiling aliphatic olefin to form low-boiling nonolefin hydrocarbons, which comprises subjecting an aliphatic hydrocarbon material comprising such an olefin to the action of between about 0.2 and 3 times its weight of concentrated hydrofluoric acid as the effective catalyst under reaction conditions such as to effect a reconstruction reaction involving a substantial portion of the olefin charged forming normally liquid low-boiling nonolefin hydrocarbons, passing effluents of said reaction to cooling and separating means and separating therefrom a liquid hydrocarbon phase and a liquid hydrofluoric acid phase, passing said hydrocarbon phase to a fractional distillation and recovering therefrom a first fraction comprising low-boiling paraffin hydrocarbons together with the hydrofluoric acid dissolved in said hydrocarbon phase and a second fraction comprising a normally liquid low-boiling nonolefin hydrocarbon as a product of the process, cooling and condensing said first fraction and passing same to a separator to separate liquid hydrofluoric acid and liquid low-boiling paraffins, passing a portion of the hydrofluoric acid phase from the aforesaid cooling and separating means back to said reaction, passing a further portion of said hydrofluoric acid phase to fractional distillation means, separating from the last said distillation means an overhead fraction comprising essentially anhydrous hydrofluoric acid and passing same to said reaction, separating also from the last said distillation means a kettle fraction comprising heavy oils and organic fluorine compounds, subjecting said kettle fraction to a thermal decomposition and recovering therefrom a low-boiling fraction comprising hydrofluoric acid and low-boiling hydrocarbons, cooling and condensing said fraction and passing same to the aforesaid separator, and passing liquid hydrofluoric acid from said separator to said reaction.

2. The process of claim 1 in which said olefin contains 4 to 12 carbon atoms per molecule.

3. The process of claim 1 wherein said olefin is a butene.

FREDERICK E. FREY.

REFERENCES CITED

The following references are of record in the file of this patent:

UNITED STATES PATENTS

| Number | Name | Date |
|---|---|---|
| 2,267,730 | Grosse et al. | Dec. 30, 1941 |
| 1,885,060 | Hofmann et al. | Oct. 25, 1932 |
| 1,989,425 | Otto et al. | Jan. 29, 1935 |
| 2,181,640 | Deanesly et al. | Nov. 28, 1939 |
| 2,275,312 | Tinker et al. | Mar. 3, 1942 |

FOREIGN PATENTS

| Number | Country | Date |
|---|---|---|
| 421,118 | Great Britain | Dec. 10, 1934 |
| 524,891 | Germany | May 23, 1931 |

OTHER REFERENCES

Grosse et al., Jour. of Organic Chem., vol. III, 26–32 (1938). (Patent Office Library.)

Fredenhagen, Zeit. Physik. Chem. A 164, 190 (1933). (Pat. Off. Lib.)